(12) United States Patent
Kloft et al.

(10) Patent No.: US 12,474,118 B2
(45) Date of Patent: Nov. 18, 2025

(54) APPARATUS AND METHOD FOR DRYING MATERIAL AND ASPHALT MIXING FACILITY HAVING SUCH AN APPARATUS

(71) Applicant: Benninghoven Zweigniederlassung der Wirtgen Mineral Technologies GmbH, Wittlich (DE)

(72) Inventors: Marius Kloft, Wittlich (DE); Dietmar Zimmer, Longkamp (DE); Steven Mac Nelly, Büchel (DE)

(73) Assignee: BENNINGHOVEN ZWEIGNIEDERLASSUNG DER WIRTGEN MINERAL TECHNOLOGIES GMBH, Wittlich (DE)

( * ) Notice: Subject to any disclaimer, the term of this patent is extended or adjusted under 35 U.S.C. 154(b) by 429 days.

(21) Appl. No.: 17/951,209

(22) Filed: Sep. 23, 2022

(65) Prior Publication Data
US 2023/0098621 A1 Mar. 30, 2023

(30) Foreign Application Priority Data
Sep. 24, 2021 (DE) ...................... 10 2021 210 662.5

(51) Int. Cl.
*F26B 11/04* (2006.01)
*F23C 1/00* (2006.01)
(Continued)

(52) U.S. Cl.
CPC ................. *F27B 7/10* (2013.01); *F23C 1/00* (2013.01); *F23D 14/24* (2013.01); *F27B 7/162* (2013.01);
(Continued)

(58) Field of Classification Search
CPC .... F23C 1/00; F23D 14/24; F27B 7/18; F27B 7/162; F27B 7/00; F27B 7/14; F26B 3/04;
(Continued)

(56) References Cited

U.S. PATENT DOCUMENTS 6,309,211 B1 * 10/2001 Dock ........................ F27D 1/04
432/119
11,543,184 B2 * 1/2023 Son ........................... F27B 7/16
(Continued)

FOREIGN PATENT DOCUMENTS

CA 2184918 A1 9/1995
CN 206073075 U * 4/2017
(Continued)

*Primary Examiner* — Gregory A Wilson
(74) *Attorney, Agent, or Firm* — McGlew and Tuttle, P.C.

(57) ABSTRACT

An apparatus for drying material for an asphalt mixing facility includes a rotary kiln rotatably drivable about an axis of rotation, in which the material is dried, wherein the rotary kiln has a material inlet and a material outlet, a heating unit coupled to the rotary kiln for feeding heat to the rotary kiln, wherein the heating unit is designed with a burner which has a burner housing having a longitudinal axis, an air duct arranged at the burner housing for feeding air, a swirling element for swirling the air in the burner housing relative to the longitudinal axis, a hydrogen gas line connected to the burner for feeding hydrogen gas into the burner, wherein a hydrogen gas nozzle is connected to the hydrogen gas line for discharging the hydrogen gas, a burner head arranged at the burner housing for generating a burner flame.

25 Claims, 6 Drawing Sheets

(51) Int. Cl.
*F23D 14/24* (2006.01)
*F27B 7/10* (2006.01)
*F27B 7/16* (2006.01)
*F27B 7/18* (2006.01)

(52) U.S. Cl.
CPC ........ *F27B 7/18* (2013.01); *F23C 2900/9901* (2013.01)

(58) Field of Classification Search
CPC .... F26B 3/06; F26B 3/18; F26B 11/02; F26B 11/0486
See application file for complete search history.

(56) References Cited

U.S. PATENT DOCUMENTS

| | | | |
|---|---|---|---|
| 2004/0219466 A1* | 11/2004 | Marino | F23D 11/107 431/9 |
| 2009/0123882 A1 | 5/2009 | Eroglu et al. | |
| 2023/0098621 A1* | 3/2023 | Kloft | F23C 1/08 432/105 |

FOREIGN PATENT DOCUMENTS

| | | | | |
|---|---|---|---|---|
| CN | 110295263 A | * | 10/2019 | |
| CN | 210176888 U | * | 3/2020 | |
| CN | 210512434 U | | 5/2020 | |
| DE | 4243264 A1 | | 6/1994 | |
| DE | 19530164 A1 | | 2/1997 | |
| DE | 202010002774 U1 | | 7/2010 | |
| DE | 102010001055 A1 | | 7/2011 | |
| DE | 102013224910 A1 | | 6/2015 | |
| DE | 102018108802 B3 | | 9/2019 | |
| DE | 102023005401 A1 | * | 9/2024 | ............ F26B 11/024 |
| EP | 0340462 A1 | | 11/1989 | |
| EP | 0580127 A1 | | 1/1994 | |
| EP | 0600525 A2 | | 6/1994 | |
| EP | 1785202 A1 | | 5/2007 | |
| EP | 3168282 A1 | * | 5/2017 | ............ E01C 19/10 |
| EP | 3196177 A1 | | 7/2017 | |
| EP | 3296462 A1 | * | 3/2018 | ........ E01C 19/1031 |
| EP | 3533930 A1 | * | 9/2019 | ............ E01C 19/05 |
| ES | 2775778 T3 | * | 7/2020 | ........ E01C 19/1036 |
| FR | 3062468 A1 | * | 8/2018 | ........ F26B 11/0477 |
| JP | 2009293859 A | * | 12/2009 | |
| KR | 20100120579 A | | 11/2010 | |
| WO | 03098110 A1 | | 11/2003 | |
| WO | 2006058843 A1 | | 6/2006 | |
| WO | 2009109454 A1 | | 9/2009 | |
| WO | WO-2013160306 A2 | * | 10/2013 | ............ F23D 11/10 |

* cited by examiner

APPARATUS AND METHOD FOR DRYING MATERIAL AND ASPHALT MIXING FACILITY HAVING SUCH AN APPARATUS

CROSS-REFERENCES TO RELATED APPLICATIONS

This application claims the priority of German Patent Application, Serial No. DE 10 2021 210 662.5, filed Sep. 24, 2021, the content of which is incorporated herein by reference in its entirety as if fully set forth herein.

FIELD OF THE INVENTION

The invention relates to an apparatus and a method for drying material and to an asphalt mixing facility having such an apparatus.

BACKGROUND OF THE INVENTION

In an asphalt mixing facility, different materials are processed, in particular dried and mixed together. When drying the material for asphalt mixing facilities, a large part of the energy input that is required for the subsequent mixing process of the asphalt takes place. The material is therefore also heated while drying. The temperature level is usually up to 450° C., depending on the type of asphalt to be mixed and the respective RC addition rate. Drying takes place in a rotary kiln, also known as a drying drum. The rotary kiln is supplied with heat which has previously been generated by a separate heating unit. The heat generation is usually based on the combustion of fossil energy sources, such as natural gas, liquid gas, fuel oil and/or pulverized coal. The combustion of fossil energy sources produces carbon dioxide, which is problematic in terms of the climate.

SUMMARY OF THE INVENTION

It is an object of the present invention to make the drying of material for an asphalt mixing facility ecologically advantageous and, in particular, climate-friendly.

This object is solved according to the invention by an apparatus for drying material for an asphalt mixing facility, wherein the apparatus comprises a rotary kiln rotatably drivable about an axis of rotation, in which the material is dried, wherein the rotary kiln has a material inlet and a material outlet, a heating unit coupled to the rotary kiln for feeding heat to the rotary kiln, wherein the heating unit is designed with a burner which has a burner housing having a longitudinal axis, an air duct arranged at the burner housing for supplying air, a swirling element for swirling the air in the burner housing relative to the longitudinal axis, a hydrogen gas line connected to the burner for feeding hydrogen gas into the burner, wherein a hydrogen gas nozzle is connected to the hydrogen gas line for discharging the hydrogen gas, a burner head arranged at the burner housing for generating a burner flame, by an asphalt mixing facility having an apparatus according to the invention and in particular having a filter dust removal system and/or, in particular, a condensate separator, which are fluidically connected to the rotary kiln, and by a method for drying material for an asphalt mixing facility, comprising the method steps of feeding the material into a rotary kiln that is rotatably drivable about an axis of rotation, generating heat with a burner of a heating unit by combusting hydrogen gas, feeding the heat to the rotary kiln, and drying the material.

According to the invention, it has been found that material can be dried in an ecologically advantageous manner if heat used in a rotary kiln for drying the material is generated by means of a hydrogen gas burner. The hydrogen gas burner is a burner in which hydrogen gas is combusted to generate heat. The apparatus may also comprise a plurality of burners which are in particular of identical design. The burners can also be of different design, wherein at least one burner, in particular a plurality of burners, and in particular all burners are designed as hydrogen gas burners. Hydrogen gas thus serves as fuel. According to the invention, the heat is generated at least proportionally and in particular exclusively by the combustion of hydrogen gas. The combustion of hydrogen gas is carbon dioxide-free, i.e. no carbon dioxide is produced. The combustion of hydrogen gas is climate-friendly. Exhaust gases and emissions are reduced. It is particularly advantageous if the hydrogen gas has been produced from renewable energies, i.e. it is so-called green hydrogen.

In particular, the rotary kiln is used to dry materials that can be used for an asphalt mixture, such as used asphalt material, which is also referred to as recycled material or RC material, and/or mineral rock, in particular white mineral. The rotary kiln is designed to be rotatably drivable about an axis of rotation and has, in particular, a cylindrical shape. The rotary kiln has a material inlet, at which the material to be dried is fed to the rotary kiln, and a material outlet, at which the dried material is discharged from the rotary kiln. The material inlet and the material outlet are arranged at a distance from each other with respect to the axis of rotation. In particular, the material inlet and the material outlet are each arranged in the region of the front ends of the rotary kiln and, in particular, are designed opposite each other at the front end of the rotary kiln.

The material inlet can have a material chute, a conveyor belt, a feed belt or other conveying techniques.

The material outlet can have a material chute and/or a round elevator or other conveying techniques.

In order to favor the material transport in the rotary kiln, the rotary kiln is arranged with its axis of rotation inclined with respect to a horizontal direction, in particular towards the material outlet. The angle of inclination is in particular at most 8°, in particular at most 5°, in particular at most 4°, in particular at most 3° and in particular at least 1°. The dwell time of the material within the rotary kiln is in particular at least one minute and in particular at most 10 minutes.

The burner used to combust the hydrogen gas for heat generation is part of a heating unit which is coupled to the rotary kiln for heat transfer. For the purposes of the invention, coupled means that the burner and the rotary kiln are coupled in terms of process technology. A burner flame generated by the burner can burn directly in the rotary kiln. In this application example, the burner and rotary kiln are also physically coupled. The burner is arranged directly at the rotary kiln.

However, the burner flame can also burn in a hot gas generator, which conducts the heat to the rotary kiln via an air flow. The heat generated by the burner is fed from the heating unit to the rotary kiln. The supply of heat to the rotary kiln includes the generation of the heat by the burner flame directly in the rotary kiln.

The burner has a burner housing having a longitudinal axis and an air duct. For the purposes of this invention, air duct describes the supply of combustion air. In particular, this can be performed by a blower arranged in the burner housing, a blower connected via an air channel or another supply of air. In particular, a flange is arranged at the burner housing, in particular at the front end, by means of which a sound absorber can be connected to the burner housing. Air, in particular ambient air, is fed into the burner housing by means of the air duct. In particular, the air duct is connected to the burner housing axially with respect to the longitudinal axis. This simplifies the supply of air to the burner housing.

A hydrogen gas line is connected to the burner, in particular to the burner housing, in order to feed hydrogen gas to the burner. A hydrogen gas nozzle is connected to the hydrogen gas line in order to selectively discharge the hydrogen gas in the burner housing. For the purposes of the present invention, a hydrogen gas nozzle may be configured as an annular nozzle, an annular gap, a gas lance, a needle nozzle, or an outlet in any other form. As a result, the generation of an air-hydrogen gas mixture and/or the generation of a burner flame are favored. The hydrogen gas nozzle is arranged in particular inside the burner housing and is designed in particular as an annular nozzle having radial openings. There can also be a plurality of hydrogen gas nozzles which are of identical or different design to one another. The hydrogen gas nozzles can be arranged at different positions with respect to the longitudinal axis, in particular in the radial, tangential and/or axial direction relative to each other.

The burner additionally has a swirling element that serves to swirl the combustion air, to mix fuel and combustion air, as a flame holder, as a fixture for fuel nozzles, for ignition burners or other burner components, and/or for similar purposes. In particular, in the embodied variant, a swirling element is introduced to swirl the air in the burner housing relative to the longitudinal axis, in particular tangentially, radially and/or axially. The mixing of the air with the hydrogen gas, in particular the homogeneity of the air-hydrogen gas mixture, is thus improved. In particular, the hydrogen gas nozzle is arranged adjacent to the swirling element and, in particular, opens directly upstream of the swirling element. The swirling element serves to define the shape of the burner flame generated by the burner. In particular, the flame, in particular when it is arranged inside the rotary kiln, shall not exceed a maximum length along the axis of rotation of the rotary kiln in order to prevent direct contact of the flame with the material in the rotary kiln. In addition, the maximum diameter of the flame shall not exceed an upper limit, i.e. the flame must not become too wide to expose the rotary kiln to excessive heat stress. The dryer drum is protected.

The burner housing has a burner head which serves to generate the burner flame. For the purposes of this invention, the burner head is to be understood as an opening arranged on the front end of the burner housing, at which the flame is formed. In particular, the burner head can be designed to be conically widening at least in sections along the longitudinal axis.

In particular, a hydrogen reservoir may be provided in which hydrogen, in particular hydrogen gas, is stored. The hydrogen reservoir is connected to the burner housing in particular by means of the hydrogen gas line. In particular, a gas safety and/or gas control system is provided along the hydrogen gas line to ensure a reliable and safe supply of the hydrogen gas from the hydrogen reservoir to the burner housing. The gas safety and/or gas control system comprises, in particular along the gas flow direction, a stopcock, a gas filter, a gas pressure regulator, in particular with impulse lines, a pressure relief valve, in particular at least one pressure switch, in particular at least one safety shut-off valve, in particular further pressure switches, a gas regulating flap and/or an additional shut-off flap, and in particular at least one pressure gauge. The hydrogen reservoir and/or the hydrogen gas line and, in particular, the hydrogen gas nozzle are each made, in particular, of a material which is suitable for storing, conveying and/or dispensing hydrogen gas and, in particular, is approved for this purpose. The components of the gas control system are in particular approved for use with hydrogen.

A swirling element which comprises a flow guiding element in the burner housing, wherein the flow element is arranged in particular to be stationary and in particular concentrically to the longitudinal axis, ensures efficient air swirling. A flow guiding element is arranged in the burner housing, in particular concentrically to the longitudinal axis. The flow guiding element is arranged stationarily, i.e. immovably, in the burner housing. In particular, the flow guiding element has no moving parts. The flow guiding element requires little maintenance and, in particular, is maintenance-free. The flow guiding element is robust and reliable.

In addition or as an alternative to the stationary flow guiding element, it is possible to supply the air duct tangentially and/or radially with respect to the longitudinal axis of the burner housing, i.e. to connect the air duct tangentially and/or radially to the burner housing. In this case, the swirling element is thus formed by a tangential air supply.

A baffle plate which has a plurality of blades arranged in a circle with respect to the longitudinal axis and oriented at an angle enables an advantageous swirling of the air and an advantageous generation of the air-hydrogen gas mixture. A plurality of blades arranged in a circle with respect to the longitudinal axis and oriented at an angle enable the axial air flow to be deflected radially and/or tangentially outwardly in the direction of the inner wall of the burner housing in a targeted manner. In particular, the baffle plate has a section at which the hydrogen gas nozzle opens out and another region to which the air is supplied. In particular, the region for supplying the hydrogen gas is designed to be annular and oriented concentrically to the longitudinal axis. In particular, the region for supplying the air at the baffle plate is arranged centrally, i.e. centrically. In particular, the two regions for supplying hydrogen gas and air are designed separately from one another on the baffle plate. At least one additional region for the supply of a secondary fuel can be provided on the baffle plate. This at least one additional region can be designed separately from or connected to the other regions. This additional region may be arranged centrally or eccentrically at the baffle plate.

The swirling element, in particular in the form of the baffle plate, makes it easier to set the shape of the burner flame regardless of the fuel used, in particular regardless of whether the secondary fuel is used in addition to the hydrogen gas. In particular, it is possible to set the shape of the burner flame in dependence on the fuel used, in particular the fuels used, in such a manner that the burner flame is suitable for drying the material in the rotary kiln, i.e. provides sufficient heat, and, in addition, damage to the rotary kiln and/or the material to be heated is excluded. The shape of the burner flame is influenced in particular by the number, design and arrangement of the nozzles for supplying the hydrogen gas and the at least one secondary fuel. The shape of the flame also depends in particular on the air curve.

The arrangement and/or size of the various regions of the baffle plate depends essentially on the fuels to be combusted. It is additionally or alternatively possible to change the geometry of the blades, to change the arrangement of the blades in the baffle plate and/or to provide additional guiding elements, such as cones and/or facing sheets.

A cooling cone arranged in the burner housing, which is arranged along the longitudinal axis, in particular between the swirling element and the burner head enables air staging within the burner housing. During the air staging, a plurality of combustion zones are created around the burner flame, which have different oxygen concentrations and grow in particular from the inside to the outside, i.e. in the radial direction. This increases the region of combustion and thus also the dwell time of the components in the burner flame. By means of the air staging, the formation of thermal nitrogen oxides (NOx) can be reduced and, in particular, a complete combustion of the fuel, in particular of hydrogen gas, can be achieved. The cooling cone has an expanding cone section. The cooling cone is arranged in the burner housing at the transition area to the burner head. An annular gap is formed between the outside of the cooling cone and the inside of the burner housing, in particular with a gap width that is constant along the longitudinal axis. In addition, the cooling cone ensures an air flow through said annular gap, whereby the axially flowing air is kept away from the burner flame, i.e. guided around the burner flame and fed to the flame in the region of the burner head. This secondary air, which has been routed around the burner flame, cools the burner head, in particular in the region of the cooling cone. In particular, this can also reduce the flame temperature in order to reduce nitrogen oxide formation.

Additionally or alternatively, air staging can also be ensured by means of an additional air connection, for example a secondary air connection. Secondary air can also be ambient air. In particular, a secondary air duct can be a recirculation duct for recirculating emission-loaded air from the rotary kiln and for post-combustion and co-combustion.

Additionally or alternatively, nitrogen oxide reduction measures are possible, in particular local combustion at different air numbers ($\lambda$), which defines the mass ratio of air and fuel in the combustion space. In particular, combustion at $\lambda \gg 1$ or at $\lambda \ll 1$ is possible. Additionally or alternatively, it is conceivable to add urea selectively to reduce nitrogen oxide formation. It is advantageous if the flame temperature is lower than 1400° C., in particular lower than 1350° C., in particular lower than 1300° C., in particular lower than 1250° C. and in particular lower than 1200° C. It has been found that the formation of thermal NOx is reduced if the flame temperature does not exceed a predetermined maximum value.

A secondary fuel line connected to the burner for supplying secondary fuel, wherein in particular a secondary fuel nozzle for discharging the secondary fuel is connected to the secondary fuel line increases the versatility of the burner. There can also be a plurality of secondary fuel lines connected to the burner, in particular to supply different types of secondary fuels. For example, natural gas, liquid gas, fuel oil, wood dust, coal dust and/or synthetic fuels can serve as secondary fuels. Such synthetic fuels are typically produced by thermochemical conversion from biomass and are referred to as Biomass to Liquid (BtL). The secondary fuels can be fed to the burner in particular in addition to the hydrogen gas, in particular if the hydrogen gas supply is restricted and/or interrupted. It is also conceivable in principle to control the secondary fuel supply in such a manner that the burner is operated exclusively with secondary fuel, i.e. without hydrogen. It is essential, however, that at least the hydrogen gas line and the hydrogen gas nozzle are provided.

A secondary fuel nozzle is connected to the secondary fuel line to discharge the secondary fuel. There may also be a plurality of secondary fuel nozzles connected to the secondary fuel line. The secondary fuel nozzle is arranged inside the burner housing. The secondary fuel nozzle opens in particular at the baffle plate, in particular centrically.

The axial arrangement of the air duct with respect to the longitudinal axis at the burner housing, wherein in particular an air blower is arranged in the air duct, enables an unsophisticated and robust construction. A blower for generating the air flow in the air duct can, in particular, be designed as an axial blower and be arranged so as to be integrated in the air duct. It is also possible to design the blower as a radial blower. In particular, a sound absorber is connected to the air duct. The blower can also be arranged outside the burner housing, in particular upstream of the air duct.

An exhaust gas line for feeding exhaust gases to the heating unit, in particular to the burner, and/or to the rotary kiln enables the co-combustion of exhaust gases, in particular in the burner. For the purposes of the present invention, exhaust gases are referred to both from combustion processes and, in particular, exhaust gases from asphalt production, in particular by suction in the mixing process and further handling of the asphalt. These exhaust gases are fed to the burner, in particular as emission-loaded air. This can additionally reduce emissions, in particular odor emissions, carbon monoxide (CO), carbon dioxide ($CO_2$) and in particular hydrocarbons ($C_{ges}$) altogether. The exhaust gas line can additionally or alternatively feed exhaust gases to the heating unit as a whole and/or into the rotary kiln.

A heating unit with a hot gas generator that is connected to the burner, wherein the hot gas generator is connected to the rotary kiln in particular by means of a hot gas line, enables an indirect heating of the rotary kiln and thus an indirect drying of the material in the rotary kiln. The hot gas generator is connected to the rotary kiln, in particular by means of a hot gas line. The hydrogen burner serves to generate process heat in the hot gas generator.

Alternatively, the burner that is attached to the front end of the rotary kiln, in particular in the region of the material outlet, in particular is integrated directly into the rotary kiln, in particular in such a way that the burner head is arranged inside the rotary kiln can be directly connected to the rotary kiln and, in particular, directly integrated into the rotary kiln. In particular, the burner is attached to the front end of the rotary kiln, in particular in the region of the material outlet. The burner head is arranged in particular inside the rotary kiln. A rotary kiln of this type is operated in counterflow. This means that the material conveying direction and the direction of heat supply are opposite to each other. In this case, the hydrogen burner burns directly in the rotary kiln. The hydrogen burner operates in a dust-loaded environment.

A rotary kiln which has, in particular, closed fire protection internals which are arranged on an inner wall of the rotary kiln and, in particular, are fastened thereto, ensures that the material in the rotary kiln is protected in the region of the burner flame. Direct material contact with the burner flame is avoided. Fire protection internals, which are in particular of closed design so that the material is arranged circumferentially in these closed fire protection internals, are arranged on an inner side of the rotary kiln and fastened thereto. This ensures that the material remains in these closed internals. Any undesirable contact between the internals and the burner flame is avoided. The heat emitted by the burner flame is dissipated into the interior of the material via the fire protection internals. The fire protection internals consist in particular of heat-resistant and/or wear-resistant material. In particular, steel which is alloyed such that it has a high temperature resistance is used for this purpose, in particular high-temperature steel, in particular high-temperature pressure vessel steel, in particular a pressure vessel steel having the material number 1.5415, which is also known by the abbreviated name 16Mo3. A material of this type can be used in continuous operation up to a wall temperature of about 530° C.

The fire protection internals are arranged in particular in the region of a burnout zone of the rotary kiln.

The fire protection internals form closed pockets on the inner surface of the rotary kiln. The material is conveyed and dried in the closed pockets until it is discharged along the material conveying direction in the rotary kiln at the material outlet.

A rotary kiln which has, in particular, open lifter plates which are arranged on an inner wall of the rotary kiln and, in particular, are fastened thereto in order to produce a, in particular, closed material veil in the rotary kiln ensures the generation of a material veil in the rotary kiln. Due to the fact that the rotary kiln is arranged in particular inclined with respect to the horizontal direction, the lifter plates ensure that the material is conveyed along the material conveying direction. The material veil is formed in particular in a heat transfer region, which is arranged in the rotary kiln upstream of the burnout zone with respect to the material conveying direction. In the heat transfer region, the rotary kiln has lifter plates which are arranged at the inner wall of the rotary kiln and, in particular, fastened thereto. The lifter plates are of open design, i.e. are open internals. In particular, the lifter plates are chamfered multiple times. Material which is picked up in the lower region during a rotation of the rotary kiln rains off over the runout into the rotary kiln. A veil is formed over the cross-sectional area of the rotary kiln and thus, in particular, a closed veil. The lifter plates are made of a heat-resistant and/or wear-resistant material. In particular, the same material is used for the lifter plates as for the fire protection internals.

The internals in the rotary kiln, in particular the lifter plates in the heat transfer zone, are designed such that the material veil ensures heat transfer in such a way that the volume flow of the exhaust gas from the rotary kiln corresponds to the conditions for subsequent filter dedusting, i.e. in particular that the exhaust gas has a temperature above its melting point and below the flash point of the filter pockets. In particular, the temperature of the exhaust gas on leaving the rotary kiln is up to 160° C., in particular between 90° C. and 110° C.

A rotary kiln which has, in particular in the region of the material inlet, at least one conveying element which is arranged on an inner wall of the rotary kiln and in particular is fastened thereto in order to achieve a material transport along the axis of rotation, enables reliable material conveying in the rotary kiln, in particular starting at the material inlet. For this purpose, at least one and in particular a plurality of conveying elements are provided in the rotary kiln, which are arranged at an inner wall of the rotary kiln and in particular fastened thereto. The conveying elements are designed in particular as inlet screw segments which extend along a helix in the rotary kiln. In particular, eleven inlet screw segments are arranged.

An asphalt mixing facility and a method according to the invention have substantially the advantages of the apparatus described above, reference being hereby made thereto. The asphalt mixing facility may have a filter dust removal system and/or a condensate separator. In the filter dust removal system, dust particles are filtered out of the exhaust gas from the rotary kiln.

Water contained in the exhaust gas flow can condense in the condensate separator. This releases additional energy in the form of heat. This utilization of calorific value in the condensate separator makes it possible in particular to separate undesirable constituents, in particular acids, from the exhaust gas. The exhaust gas is additionally cleaned by the condensate separator. The condensate separator is arranged in particular downstream of the filter dust removal system.

In particular, the asphalt mixing facility also has a blower and/or a funnel arranged downstream of the filter dust removal system and/or the condensate separator.

The asphalt mixing facility may additionally have at least one mixing unit in which various materials which are required for an asphalt mixture are mixed together. These materials can, for example, originate from the rotary kiln. It is also conceivable that materials are fed directly into a mixing unit, in particular by means of a metering device.

A method comprising feeding exhaust gases to the heating unit, in particular to the burner, and/or to the rotary kiln by means of an exhaust gas line enables particularly efficient co-combustion of exhaust gases so that overall emissions are reduced.

A method in which the heat is supplied by a burner flame inside the rotary kiln, so that the burner flame is arranged in particular in a dust-loaded environment allows heat to be fed directly into the rotary kiln. The burner flame is located, at least partially and in particular completely, inside the rotary kiln, i.e. in a dust-loaded environment.

A method in which the burner flame in the rotary kiln has a length oriented along the axis of rotation which is smaller than or equal to a length of a burnout zone of the rotary kiln oriented along the axis of rotation or in which the burner flame has a diameter oriented perpendicular to the axis of rotation which is smaller than an inside diameter of the burnout zone of the rotary kiln reduced by fire protection internals ensures that the burner flame is reliably arranged within the burnout zone of the rotary kiln and, in particular, that fire protection internals of the rotary kiln are arranged, in particular radially, at a distance from the burner flame. A direct contact of the burner flame with the fire protection internals is prevented.

Both the features indicated in the above description and the features indicated in the following embodiment of the methods according to the invention are in each case suitable, individually or in combination with each other, for further developing the subject matter according to the invention. The respective combinations of features do not represent any restriction with respect to the further developments of the subject-matter of the invention, but are essentially merely exemplary in character.

Additional features, advantageous designs and details of the invention will be apparent from the following description of an embodiment based on the drawing.

DESCRIPTION OF THE PREFERRED EMBODIMENT

Figure 1:
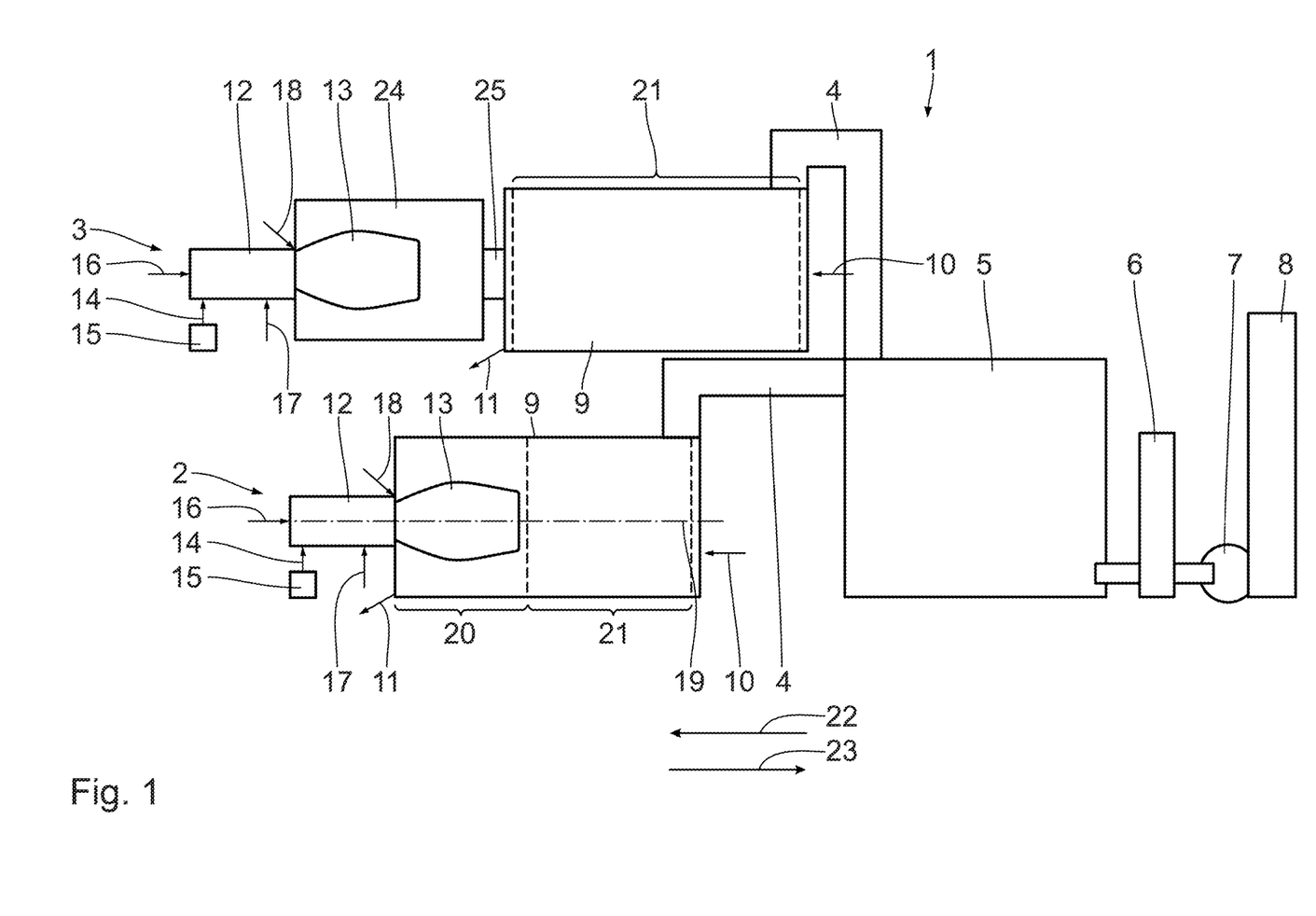
FIG. 1 shows a schematic diagram of an asphalt mixing facility having an apparatus according to the invention.

An asphalt mixing facility shown in FIG. 1 in its entirety as 1 serves to produce asphalt. The asphalt mixing facility 1 comprises a first apparatus 2 and a second apparatus 3, each of which is connected to a filter dust removal system 5 by means of an emission line 4.

The asphalt mixing facility 1 may also have only one apparatus 2, 3 or more than two apparatuses 2, 3. It is conceivable that the one or more apparatuses 2, 3 are connected to the filter dust removal system 5 via a common emission line 4. In particular, the filter dust removal system 5 is a central filter dust removal system in the asphalt mixing facility, to which a plurality of, and in particular all, apparatuses 2, 3 of the asphalt mixing facility 1 are connected. It is also conceivable that each apparatus 2, 3 is associated with and connected to a separate filter dust removal system 5.

A condensate separator 6 is optionally connected to the filter dust removal system 5, which condensate separator 6 is connected to a funnel 8 via a blower 7. As shown in FIG. 1, the condensate separator 6 can be arranged downstream of the filter dust removal system 5 and additionally or alternatively also upstream of the filter dust removal system 5. In particular, in addition to the condensate separator, a recuperation unit is provided, which serves to recover process heat, in particular process heat generated in the condensate separator 6. It has been found that the condensate separator 6 can be used advantageously in the asphalt mixing facility 1 if the exhaust air from the apparatuses 2, 3 is comparatively clean, i.e., has a reduced emission load and, in particular, is less polluted with emissions than the exhaust air from a burner which combusts fossil fuels.

It is also possible that the asphalt mixing facility 1 does not have a filter dust removal system 5. In this case, the apparatuses 2, 3 are directly connected to the condensate separator 6. It is also conceivable that a plurality of condensate separators 6 are provided, in particular one condensate separator 6 per apparatus 2, 3.

The first apparatus 2 comprises a rotary kiln 9 in which material is dried. The rotary kiln 9 has a material inlet 10 and a material outlet 11. According to the embodiment shown, the material inlet 10 and the material outlet 11 are each arranged at the front end, i.e. opposite one another, of the rotary kiln 9.

A heating unit which has a burner 12 is coupled to the rotary kiln 9. The burner 12 is designed to combust hydrogen gas and to generate a burner flame 13, which is arranged at least in regions in the rotary kiln 9. The burner 12 is a hydrogen burner. A hydrogen gas line 14 is connected to the burner 12, which is in particular connected to a hydrogen reservoir 15. The hydrogen reservoir 15 is in particular a storage container, in particular a storage tank, in which hydrogen, in particular in gaseous form, is stored. The hydrogen reservoir 15 can also be implemented by a connection to a hydrogen supply network. The connection to the gas control system in the hydrogen gas line 14 is made at a hydrogen gas distribution chamber 30 by means of a compensator 62. The compensator 62 is a flexible compensating element. The compensator 62 is used to compensate for movements of the hydrogen line 14, in particular as a result of thermal length changes, vibrations, wall penetrations and/or in the event of subsidence phenomena. The compensator 62 is arranged at a flange connection 63 between the hydrogen distribution chamber 30 and the hydrogen gas line 14.

An air duct 16 is connected to the burner 12 to supply air, in particular ambient air.

A material conveying direction 22 through the rotary kiln 9 is directed from the material inlet 10 to the material outlet 11 and oriented from right to left according to FIG. 1. A gas conveying direction 23 through the rotary kiln 9 is directed from the burner 12 to the emission line 4, thus oriented from left to right according to FIG. 1. The material conveying direction 22 and the gas conveying direction 23 are oriented opposite to each other. The rotary kiln 9 is operated in counterflow mode. The rotary kiln 9 can also be operated in the co-flow mode.

Furthermore, a first secondary fuel line 17 is connected to the burner to supply a first secondary fuel. In particular, fossil energy sources, such as natural gas, liquid gas, fuel oil, coal, in particular pulverized coal, synthetic fuels (BtL) and/or wood dust, serve as secondary fuel. In the shown embodiment, natural gas is used as the first secondary fuel. The first secondary fuel line 17 is fed from a secondary fuel reservoir not shown. The secondary fuel reservoir can be designed—similar to the hydrogen reservoir 15—as a storage tank and/or as a supply network.

The connection to the first secondary fuel line 17 and the gas control system there is made at a secondary fuel distribution chamber 32 by means of a compensator 66. The compensator 66 is substantially identical in design to the compensator 62 and is arranged at a corresponding location between the first secondary fuel line 17 and the secondary fuel distribution chamber 32.

It is understood that when a different first secondary fuel is used, for example a liquid secondary fuel such as liquid gas and/or oil, the burner may have a different geometry, wherein this applies in particular to the burner head, the baffle plate, the combustion chamber, the arrangement, number and attachment of the nozzles used and the peripherals such as an oil control system and/or a liquid gas control system.

The first apparatus 2 further has an exhaust gas line 18 which is connected to the heating unit, in particular the burner 12, and/or to the rotary kiln 9. By means of the exhaust gas line 18, exhaust gases and/or emissions can be fed to the heating unit and/or the rotary kiln 9. The exhaust gas line 18 basically serves as a supply line for secondary air, wherein it can in particular be exhaust air from other emission sources such as in particular an extraction system of a bucket conveyor and/or a loading system. The secondary air is in particular emission-loaded air. The exhaust line 18 may, for example, be connected to the emission line 4 of the first apparatus 2 and/or to the emission line 4 of the second apparatus 3 in order to return exhaust gases. Other exhaust gas sources of the asphalt mixing facility 1 may additionally or alternatively be connected to the exhaust gas line 18. A separate fan 48 is arranged in the exhaust gas line 18, which can supply additional combustion air. Along the exhaust gas line 18, one or more flaps 49 may be arranged to selectively control the air flow and, in particular, to selectively adjust the quantities of air added. In addition or alternatively, air volume flow control can also be performed with the fan 48 and in particular by means of a frequency converter connected thereto.

According to the embodiment shown, the exhaust gas line 18 is branched, wherein a first branch opens directly into the rotary kiln 9, in particular adjacent to the burner head 41. Another part of the exhaust gas line 18 opens directly into the burner housing 27, in particular in the region of an annular gap 50 and/or in the region of the burner head 41.

The rotary kiln 9 can be driven in rotation about an axis of rotation 19. The drives required for this, in particular rotary drives, are known per se and are not shown in the figures for reasons of clarity. Along the axis of rotation 19, the rotary kiln 9 has a burnout zone 20 which extends along the axis of rotation 19 in the region of the burner flame 13.

The rotary kiln 9 further has a heat transfer region 21 in which heat is transferred to the material by convection.

The second apparatus 3 is substantially of identical design to the first apparatus 2, to which reference is hereby made. One difference is that the heating unit of the second apparatus 3 comprises a hot gas generator 24 in addition to the burner 12. The hot gas generator 24 is connected to the rotary kiln 9 by means of a hot gas line 25. The hot gas generator 24 is arranged between the burner 12 and the rotary kiln 9. In the second apparatus 3, the burner 12 is designed separately from the rotary kiln 9. In particular, the burner 12 is arranged completely outside the rotary kiln 9. Correspondingly, the burner flame 13 is arranged in the hot gas generator 24. No burner flame is arranged in the rotary kiln 9 of the second apparatus 3. In the second apparatus 3, circulating air fans and/or exhaust air fans not shown in more detail can be used for air guidance, in particular in the rotary kiln 9 and/or in the hot gas generator 24. The fans are arranged in particular outside the rotary kiln 9 and/or outside the hot gas generator 24, in particular along connecting lines. Correspondingly, a burnout zone 20 is not required in this rotary kiln 9. The rotary kiln 9 of the second apparatus 3 comprises substantially exclusively a heat transfer zone 21.

In the embodiment shown, each apparatus 2, 3 has its own separate hydrogen reservoir 15. It is also conceivable that a common, centrally arranged hydrogen reservoir 15 is available in an asphalt mixing facility 1, which hydrogen reservoir 15 is in fluid communication with a plurality of and at least with all burners 12 of the asphalt mixing facility 1.

The structure and function of the first apparatus 2, in particular of the burner 12, are explained in more detail below with reference to FIG. 2.

The burner 12 has a burner housing 27 having a longitudinal axis 26. At an end facing away from the rotary kiln 9, the burner housing 27 has an intake chamber 28 via which air, in particular ambient air, is sucked into the burner housing 27. For this purpose, the air duct 16 and/or a sound absorber can be connected to the intake chamber 28. An air blower 29 is arranged along the burner housing 27, which, according to the embodiment shown, is designed as an axial blower. It is understood that the air blower 29 can also be designed in the manner of another blower type, in particular as a radial blower.

In particular, the burner 12 has a flame sensor 64 which serves to monitor the burner flame 13. In particular, a plurality of flame sensors 64 may be implemented on the burner 12 and may be spaced apart from one another, in particular along the longitudinal axis 26, in the burner housing 27. An ignition burner 65, which serves to ignite the burner flame 13, is further provided in the burner housing 27.

The hydrogen line 14 is connected to the burner housing 27 via a hydrogen gas distribution chamber 30 arranged annularly around the burner housing 27. At least one hydrogen gas nozzle 31 is connected to the hydrogen gas distribution chamber 30 for selectively feeding the hydrogen gas into the burner housing 27. It is conceivable that no hydrogen gas distribution chamber 30 is provided. In this case, the hydrogen line 14 is directly connected to the hydrogen nozzle 31.

The hydrogen gas nozzle 31 is designed in particular as a ring nozzle. It is also conceivable that the hydrogen gas nozzle 31 has a geometry deviating therefrom and is designed in particular as a gas lance. It is also conceivable that a plurality of hydrogen gas nozzles 31, in particular of different design, are provided, which are arranged at different positions, in particular along the longitudinal axis 26 and/or at different positions in the circumferential direction and/or with different radial spacing with respect to the longitudinal axis 26 in the burner housing 27.

A secondary fuel distribution chamber 32 is connected to the first secondary fuel line 17, the function of which secondary fuel distribution chamber 32 corresponds to the hydrogen gas distribution chamber 30, to which reference is hereby made. According to the shown embodiment, a plurality of secondary fuel nozzles 33 are arranged in the burner housing 27 and connected to the secondary fuel distribution chamber 32. The secondary fuel nozzles 33 are each configured as gas lances and are arranged adjacent to the hydrogen nozzle 31 in the burner housing 27. The first secondary fuel nozzles 33 are arranged in the burner housing 27 spaced apart in the radial direction with respect to the longitudinal axis 26.

Figure 2:
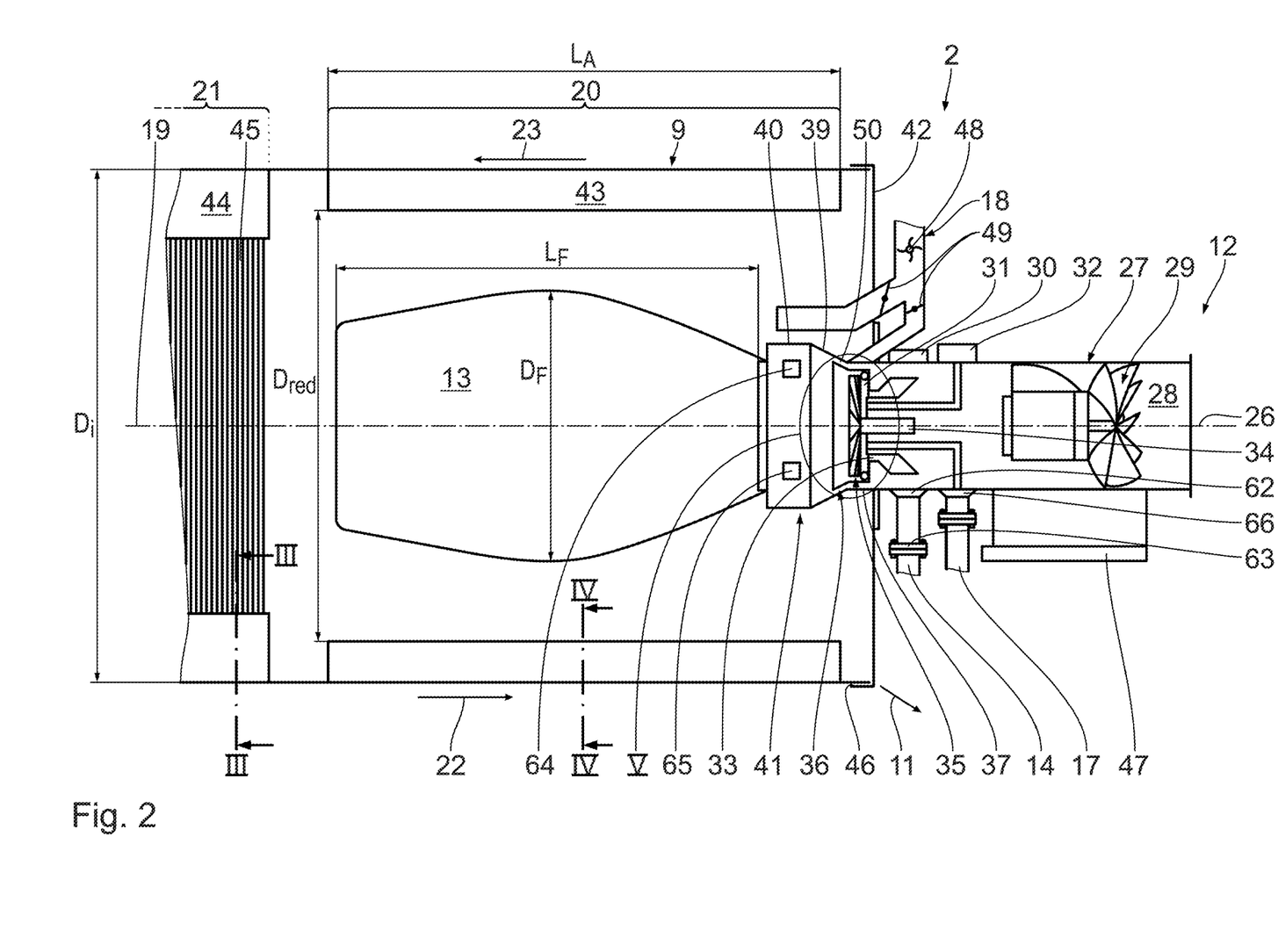
FIG. 2 shows a schematic sectional view of a rotary kiln having a burner as shown in FIG. 1.

As shown in FIG. 2, a second secondary fuel nozzle 34 is arranged in the burner housing 27, which second secondary fuel nozzle 34 serves to supply liquid fuels. The second secondary fuel nozzle 34 is arranged in particular centrally, i.e. centrically with respect to the longitudinal axis 26, in the burner housing 27. A second secondary fuel line is connected to the second secondary fuel nozzle 34, which is not shown in FIG. 2 for reasons of illustration. The second secondary fuel nozzle 34 serves in particular for the supply of oil, in particular light oil and/or heavy oil. The second secondary fuel nozzle 34 is designed, for example, as a compressed air or return nozzle. The second secondary fuel nozzle 34 can also be designed as a ring nozzle having a plurality of liquid gas nozzles.

The burner 12 is a combination burner, in particular a three-fuel burner, which can combust hydrogen gas, a first, in particular gaseous, secondary fuel, in particular natural gas, and a second, in particular liquid, secondary fuel, in particular light oil. In doing so, the supply of the various fuels to the burner 12 can be carried out independently by means of its control system suitable for this purpose, in particular in such a way that either only one of the three fuels, in particular hydrogen, two of the three fuels or all three fuels together are fed to the burner 12 and combusted there.

A swirling element 35 is arranged in the burner housing 27 in the region of the nozzles 31, 33 and 34. The swirling element 35 serves to swirl the air tangentially. The swirling element 35 is designed in particular as a baffle plate, which in particular has a guide wheel. Depending on the fuel combination used, the diameter, shape and design details of the baffle plate 35 may vary.

In the embodiment shown, the nozzles 31, 33, 34 are each arranged upstream of the swirling element 35. It is possible that individual nozzles 31, 33, 34, a plurality of the nozzles or all of the nozzles are arranged downstream of the swirling element 35 in the burner housing 27. The geometry of the burner flame 13 also depends on the number and/or position of the nozzles 31, 33 and 34.

By using the different nozzles 31, 33 and 34, a separate addition of the different fuels is possible. In particular, a time-controlled addition of the different fuels and, in particular, a locally separated addition of the fuels is possible. The control of the addition rate and/or the addition timing is performed by a burner control system not shown in more detail. The burner control system can be controlled by means of a temperature monitoring system using temperature sensors not shown in more detail and/or in dependence on a signal generated by the flame sensor 64.

In particular, it is possible to apply a staged addition for the hydrogen gas, for example by designing the hydrogen gas nozzles as gas lances of different lengths and/or having a radially arranged gas outlet.

The swirling element 35 is arranged in a cooling cone 36. According to the embodiment shown, the cooling cone 36 has a cylindrical section whose outer diameter is at least 80% of the inner diameter of the burner housing 27 at this point. In particular, the outer diameter of the cooling cone 36 is at least 85%, in particular at least 90%, in particular at least 95% and in particular at most 99% of the inner diameter of the burner housing 27 at this point. The cooling cone 36 is arranged in particular in a region of the burner housing 27 in which the burner housing widens conically. The burner housing 27 has an expanding section 39 which merges into a terminal section 40. The terminal section 40 and the expanding section 39 form a burner head 41. A circumferential annular gap 50 is formed between an outer wall of the cooling cone 36 and an inner wall of the burner head 41. The air flowing through this annular gap is referred to as secondary air. The secondary air thus flows past the cooling cone 36. The air flowing through the cooling cone 36 is referred to as primary air. Due to the fact that at least part of the air is directed past the cooling cone 36 as secondary air, air staging is possible.

In the embodiment shown, the burner head 41 improves the mixing of the fuels, in particular of hydrogen with air. Behind the burner head 41, the burner flame 13 is formed, wherein the shape of the burner flame 13 is influenced by the geometry of the burner head 41. This means that the shape of the burner flame 13 can be specifically adjusted by a suitable selection of the burner head geometry. In particular, the larger the diameter at the outlet of the burner head 41, the larger the diameter $D_F$ of the burner flame 13.

The burner 12 is attached to an end wall 42 of the rotary kiln 9. The end wall 42 is referred to as the outlet end wall, since the material outlet 11 is arranged in this region. The burner 12, in particular the burner housing 27, is fastened to the end wall 42 by means of fastening elements not shown in more detail.

As indicated in FIG. 2, the end wall 42 is arranged overlapping at the rotary kiln 9, in particular in axial direction and/or in radial direction with respect to the axis of rotation 19. In particular, the rotary kiln 9 is not hermetically sealed by the end wall 22. A circumferential gap 46 remains between the end wall 42 and the rotary kiln 9. The circumferential gap 46 allows an additional supply of air, in particular ambient air.

The burner 12 is arranged at the rotary kiln 9 in particular such that the longitudinal axis 26 of the burner housing 27 and the axis of rotation 19 of the rotary kiln 9 coincide, i.e. are identical. The burner 12 is arranged concentrically to the rotary kiln 9.

The burner 12 is attached directly to the rotary kiln 9 and is integrated therein at least in certain regions. In particular, the burner head 41 and the burner flame 13 generated by the burner 12 are arranged, in particular completely, inside the rotary kiln 9.

The burner 12 has a burner frame 47 with which the burner 12 is placed on a ground. According to the embodiment shown, the burner frame 47 is configured to be static, i.e. immovable, in particular fixed. It is also conceivable that the burner frame has rollers on its underside, which rollers in particular can be rolled on rails suitable therefor. In particular, it is conceivable that an axial displacement of the burner 12 along the rails takes place by means of an axial drive, in particular by means of a pneumatic drive.

Along the longitudinal axis 26 or the axis of rotation 19, the burner flame 13 has a length $L_F$ and a diameter $D_F$ oriented perpendicularly thereto.

The rotary kiln 9 has an inner diameter $D_i$. In the burnout zone 20, fire protection internals 43 are provided which are attached to the inner wall of the rotary kiln 9. As a result of the fire protection internals 43, there is a reduced inner diameter $D_{red}$ in the burnout zone 20. In the axial direction, the fire protection internals 43 extend along a length $L_A$ which corresponds to the length of the burnout zone 20. It is essential that the length $L_A$ of the burnout zone 20 is greater than the length $L_F$ of the burner flame 13, and that the burner 12 is arranged on the rotary kiln 9 such that the burner flame 13 is arranged completely within the burnout zone 20, in particular in the axial direction with respect to the axis of rotation 19. Furthermore, it is essential that the diameter $D_F$ of the burner flame 13 is smaller than the reduced diameter $D_{red}$. Direct flame contact of the fire protection internals 43 is avoided.

In the heat transfer region 21, lifter plates 44 are arranged and fastened in particular to the inside of the rotary kiln 9. The lifter plates 44 are designed to be open and serve to generate a material veil 45. It is particularly advantageous if the material veil is as dense as possible. It is possible to quantify the density of the material veil 45 indirectly, in particular by means of a measurement of the exhaust gas temperature. The lower the exhaust gas temperature, the greater the heat transfer to the material that occurred beforehand. This means that the lower the exhaust gas temperature will be, the denser the material veil 45 will be and vice versa. The exhaust gas temperature results from the burner performance, the pre-metering performance, i.e. the mass flow of the material fed into the rotary kiln 9, and the material temperature. The material temperature serves in particular as an input variable for controlling the burner performance. It has been found that it is advantageous if the exhaust gas temperature in the embodiment shown is at least 100° C. It is understood that depending on the material used, the burner 12 used or the fuels used, the exhaust gas temperature for monitoring the material veil 45 may assume other values.

Figure 3:
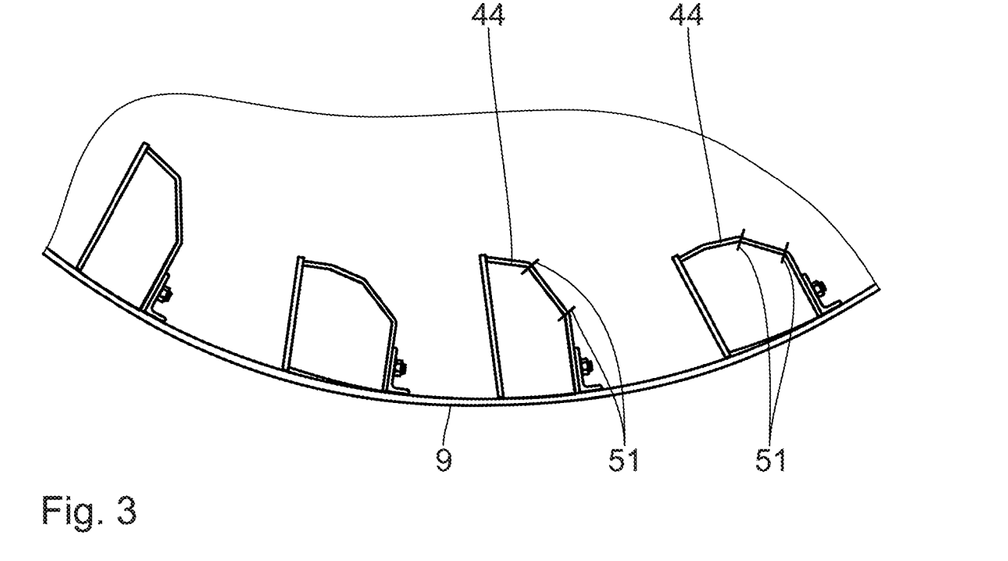
FIG. 3 shows an enlarged sectional view according to section line III-III in FIG. 2.

In the following, the geometry of the lifter plates 44 is explained in more detail with reference to FIG. 3. It is possible that different geometries of lifter plates are used. According to the illustration shown, two different lifter plate geometries are arranged alternately and spaced apart along the circumferential direction. The individual lifter plates 44 are attached to the inside of the rotary kiln 9 by means of a retaining element, in particular a retaining bracket. The lifter plates 44 are so-called open internals and, in particular, are of shovel-like design. The lifter plates 44 are chamfered multiple times, i.e. have at least two edges 51. To this end, the lifter plates 44 are designed such that a material veil 45 is formed that is as dense, continuous and homogeneous as possible. The material veil 45 has a particularly large surface area, which improves heat transfer by convection.

The specific geometry of the lifter plates 44 and, in particular, their arrangement on the inside of the rotary kiln 9 can vary for different materials, different material moisture contents and/or drying capacities in order to produce the densest possible material veil 45. For example, when drying recycled asphalt, rake-like internals, radially oriented half-shells, or other geometries may be advantageous for producing the material veil. The background is that depending on the material used, its moisture content and/or the drying capacity of the rotary kiln 9, the discharge characteristics from the lifter plates 44 may vary.

Figure 4:
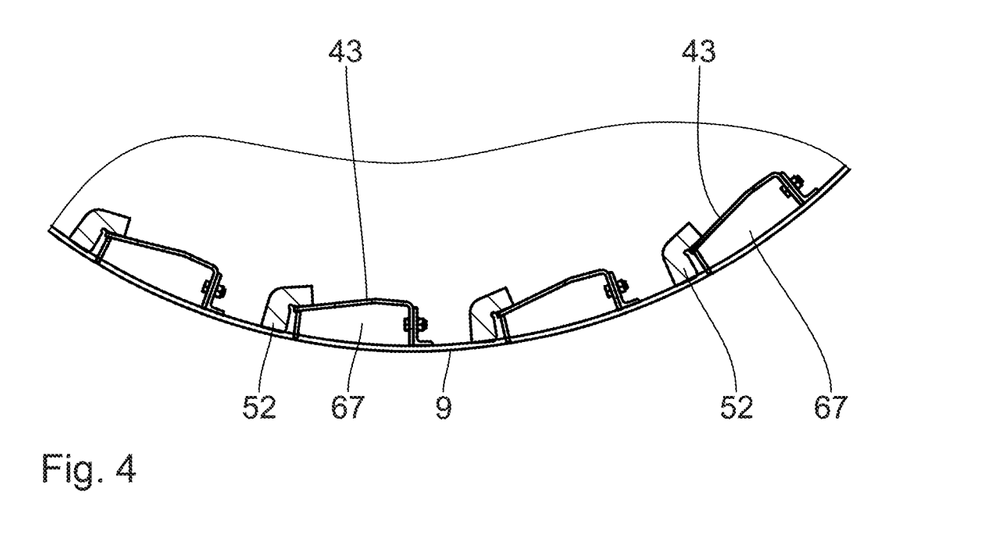
FIG. 4 shows an enlarged sectional view according to section line IV-IV in FIG. 2.

The geometry and function of the fire protection internals 43 are explained in more detail below with reference to FIG. 4. The fire protection internals 43 are closed internals, i.e. as shown in FIG. 4, they form an essentially C-shaped frame which is arranged with its open side at the rotary kiln 9 and is thus closed. Each fire protection internal part 43 and the corresponding section of the rotary kiln 9 form a closed chamber 67 which is open only in the axial direction, i.e. perpendicular to the drawing plane of FIG. 4.

The fire protection internals 43 are each held in place by means of a retaining bracket 52.

The material arranged in the chamber 67 is protected. A direct contact with the burner flame 13 in the burnout zone is thus avoided. The material is transferred indirectly by heat radiation from the surface of the fire protection internals 43 into the material. The fire protection internals 43, the lifter plates 44 and the rotary kiln 9 as a whole are made of heat-resistant and wear-resistant material.

Figure 5:
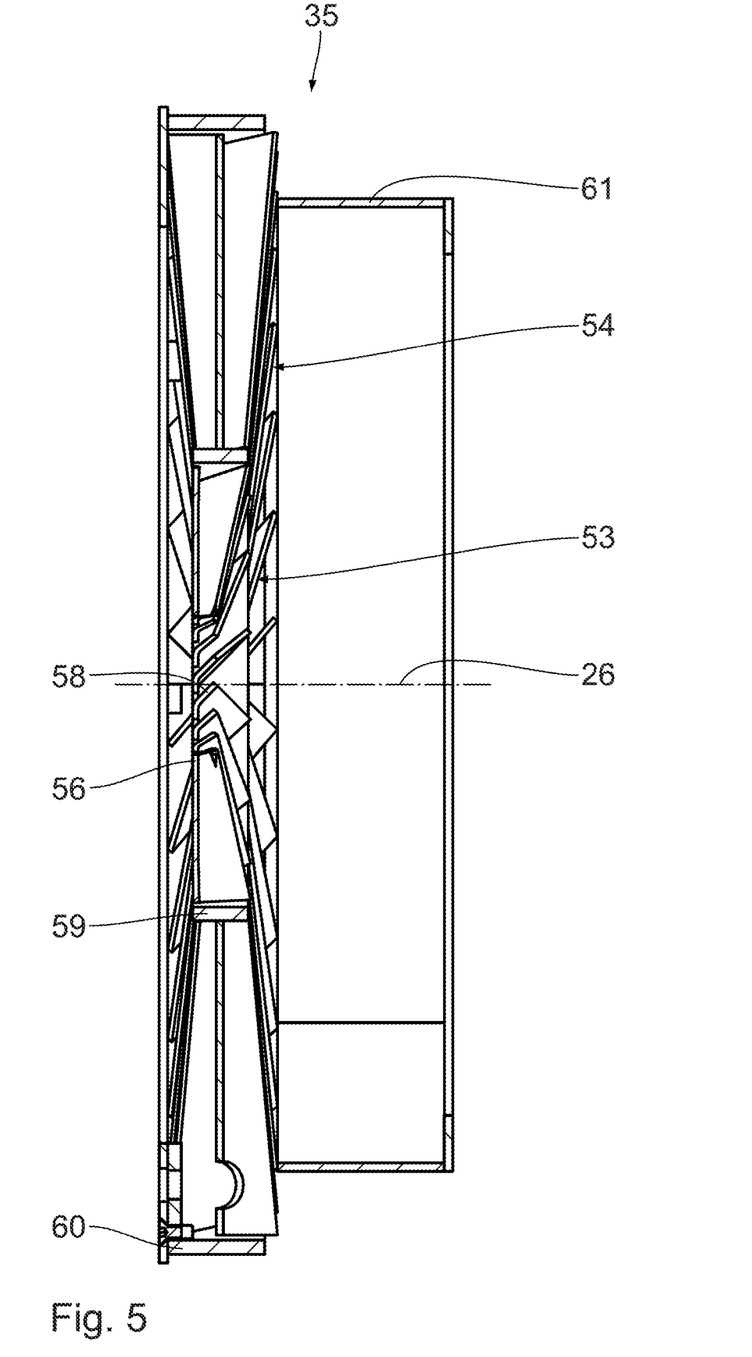
FIG. 5 shows an enlarged detail view of detail V in FIG. 2.
Figure 6:
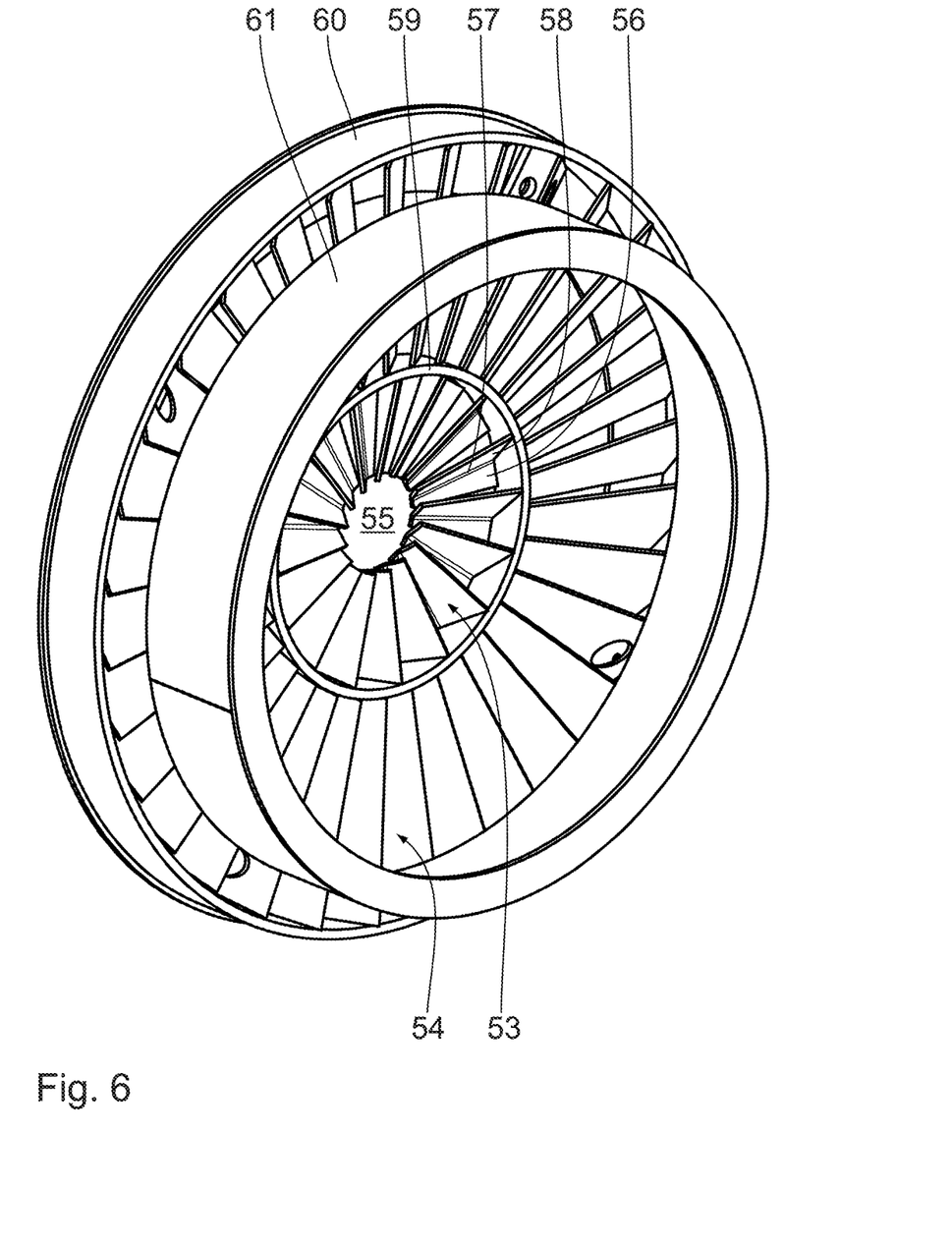
FIG. 6 shows a perspective view of the baffle plate in FIG. 5.
Figure 7:
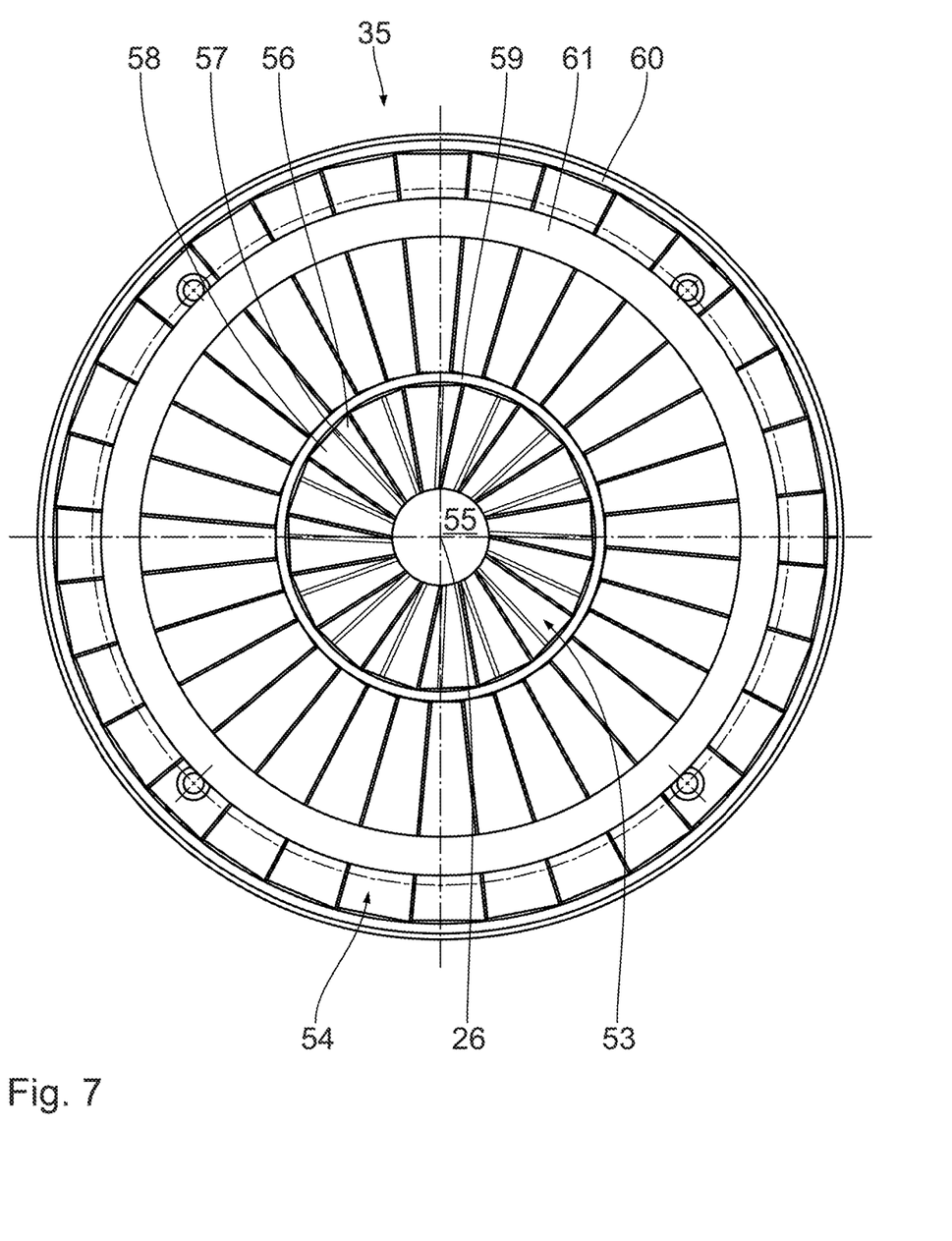
FIG. 7 shows a rear view of the baffle plate according to FIG. 5.

The structure and function of the swirling element 35 is explained in more detail below from FIGS. 5 to 7. The swirling element 35 is designed as a baffle plate. The essential function of the baffle plate 35 is to tangentially swirl the air arriving along the longitudinal axis 26, i.e. the primary air. The baffle plate 35 is arranged concentrically to the longitudinal axis 26 in the burner housing 27. The baffle plate 35 has a plurality of blades 53, 54. The inner blades 53 are arranged overlapping each other in a circular manner in the circumferential direction around the longitudinal axis 26. According to the shown embodiment, sixteen blades 53 are arranged. A central passage opening 55 remains in a central region surrounded by the inner blades 53. The inner blades 53 have a transverse web 56 oriented to be perpendicular to the longitudinal axis 26. The transverse web 56 is integrally connected to a diagonal web 58 via the edge 57. The transverse web 56 and the diagonal web 58 include an opening angle that is greater than 90° and less than 180°, in particular between 120° and 150°.

The inner blades 53 are held in an inner ring 59. The inner ring 59 is framed by outer blades 54, which are held on their outer side against an outer ring 60. The outer ring 60 projects in the axial direction with respect to the longitudinal axis 26 on the inner ring 59 in both directions. In particular, the outer blades 54 are designed without chamfering, i.e. they have a flat, planar geometry. A central ring 61 is fitted axially on the outer blades 54 with respect to the radial direction between the inner ring 59 and the outer ring 60. In the direction of the longitudinal axis 26, the baffle plate 35 has an incident flow surface which is divided into three parts. The incident flow surface comprises the inner central region, which is formed by the passage 55 and the inner blades 53 and is closed off by the inner ring 59. In particular, the second secondary fuel nozzle 34 for oil is arranged in this region. A second section is formed in the radial direction between the inner ring 59 and the central ring 61. The first secondary fuel nozzles 33 for gas, in particular natural gas, are arranged in this region.

The outer blades 54 are oriented at an angle with respect to the longitudinal axis 26 and, in particular, are arranged in a plane which corresponds substantially to the plane of the corresponding diagonal webs 58 of the inner blades 53.

An outer, in particular annular, section between the central ring 61 and the outer ring 60 can be flowed against by the hydrogen nozzle 31, which is designed as an annular nozzle.

In the following, a method for drying material in the asphalt mixing facility 1 is explained in more detail with reference to FIGS. 1 to 7.

In the first apparatus 2, material can be fed to the rotary kiln 9 via the material inlet 10. The material is conveyed along the material conveying direction 22 at the material inlet 10 by means of conveying elements not shown in more detail, which are designed in particular as inlet screw segments and are attached to the inner wall of the rotary kiln. In this process, a dense, continuous and homogeneous material veil 45 is produced in the heat transfer region 21 due to the special design of the lifter plates 44, so that the material is arranged with a very large surface area within the rotary kiln 9.

Heating of the material can take place by means of the burner flame 13 by convection, which is arranged directly in the rotary kiln 9.

The burner flame 13 is generated by the burner 12, which is designed as a combination burner and which combusts hydrogen gas as a primary fuel. Natural gas and light oil in particular serve as secondary fuels. It is understood that secondary fuels deviating therefrom can also be used, in particular only one secondary fuel or more than two secondary fuels. The burner 12 can also be operated without secondary fuels and/or exclusively by means of secondary fuels. Due to the fact that hydrogen gas is used as a primary fuel, exhaust gases and/or emissions are reduced and in particular avoided. As a result of the fact that exhaust gases and/or air contaminated with emissions are supplied via the exhaust gas line 18 and co-combusted, there is an overall reduction in exhaust gases.

Due to the fact that closed fire protection internals 43 are arranged in the burnout zone 20 in the rotary kiln 9 in which the burner flame 13 is arranged, direct material contact with the burner flame 13 is avoided. It is essential that the burner flame 13 can be adjusted in a targeted manner on the basis of the geometry of the burner head 41 and/or the baffle plate 35 of the number, arrangement and design of the fuel nozzles 31, 33 and/or 34 so that it is arranged completely within burnout zone 20 in the rotary kiln 9. In particular, the cooling cone 36 and the annular gap 50 formed between the cooling cone 36 and the burner housing 27 create the condition for air staging. Secondary air is directed past the baffle plate 35 and around the burner flame 13.

In particular, it is possible to keep the flame temperature as low as possible, especially at less than 1400° C., so that the formation of nitrogen oxides (NOx) is minimized and in particular avoided.

In order to be able to set the desired shape of the burner flame 13 depending on the fuels used, it can be advantageous to change the number, design and/or position of the fuel nozzles 31, 33 and/or 34 relative to the baffle plate 35. In particular, it is possible to arrange individual and/or all nozzles 31, 33 and 34 behind the baffle plate 35 with respect to the gas conveying direction 23. The inner diameter $D_I$ of the rotary kiln 9 is selected in particular such that, given the resulting exhaust gas volume flows of the various fuels, their flow speed is so low that only filler, i.e. rock dust having a particle size of no more than 200 μm, is discharged from the rotary kiln 9. In particular, the flow speed is less than 20 m/s and in particular between 15 m/s and 20 m/s. It is advantageous if the flow speed and/or the volume flow of the exhaust gas is kept low. As a result, wear in raw gas channels and/or in an exhauster line can be reduced and, in particular, minimized.

What is claimed is:

1. An apparatus for drying material for an asphalt mixing facility, wherein the apparatus comprises:
    a rotary kiln rotatably drivable about an axis of rotation, in which the material is dried, wherein the rotary kiln has a material inlet and a material outlet;
    a heating unit coupled to the rotary kiln for feeding heat to the rotary kiln, wherein the heating unit is designed with a burner which has:
        a burner housing having a longitudinal axis;
        an air duct arranged at the burner housing for supplying air;
        a swirling element for swirling the air in the burner housing relative to the longitudinal axis;
        a hydrogen gas line connected to the burner for feeding hydrogen gas into the burner, wherein a hydrogen gas nozzle is connected to the hydrogen gas line for discharging the hydrogen gas;
        a burner head arranged at the burner housing for generating a burner flame, wherein the burner is operable with hydrogen gas alone.

2. The apparatus according to claim 1, wherein the swirling element comprises a flow guiding element in the burner housing.

3. The apparatus according to claim 2, wherein the flow element is arranged to be stationary to the longitudinal axis.

4. The apparatus according to claim 2, wherein the flow element is arranged concentrically to the longitudinal axis.

5. The apparatus according to claim 2, wherein the flow guiding element is designed as a baffle plate which has a plurality of blades arranged in a circle with respect to the longitudinal axis and oriented at an angle.

6. The apparatus according to claim 1, comprising a cooling cone arranged in the burner housing, which is arranged along the longitudinal axis.

7. The apparatus according to claim 6, wherein the cooling cone is arranged between the swirling element and the burner head.

8. The apparatus according to claim 1, wherein the hydrogen gas is the only fuel delivered to the burner.

9. The apparatus according to claim 1, wherein the air duct is arranged axially to the longitudinal axis at the burner housing.

10. The apparatus according to claim 1, further comprising an exhaust gas line for feeding exhaust gases to at least one of the group comprising the heating unit and the rotary kiln.

11. The apparatus according to claim 1, wherein the heating unit comprises a hot gas generator that is connected to the burner, wherein the hot gas generator is connected to the rotary kiln.

12. The apparatus according to claim 1, wherein the burner is attached to the front end of the rotary kiln.

13. The apparatus according to claim 12, wherein the rotary kiln has fire protection internals which are arranged on an inner wall of the rotary kiln.

14. The apparatus according to claim 13, wherein the fire protection internals are closed.

15. The apparatus according to claim 12, wherein the rotary kiln has lifter plates which are arranged on an inner wall of the rotary kiln in order to produce a material veil in the rotary kiln.

16. The apparatus according to claim 15, wherein the lifter plates are configured to be open.

17. The apparatus according to claim 12, wherein the rotary kiln has at least one conveying element which is arranged on an inner wall of the rotary kiln in order to achieve a material transport along the axis of rotation.

18. The apparatus according to claim 17, wherein the at least one conveying element is located in the region of the material inlet.

19. The apparatus according to claim 1, wherein the burner is integrated directly into the rotary kiln.

20. An asphalt mixing facility having an apparatus according to claim 1.

21. The asphalt mixing facility according to claim 20, further comprising one of a filter dust removal system and a condensate separator, which are fluidically connected to the rotary kiln.

22. An apparatus for drying material for an asphalt mixing facility, the apparatus comprising:
    a rotary kiln rotatably drivable about an axis of rotation, in which the material is dried, wherein the rotary kiln has a material inlet and a material outlet;
    a heating unit coupled to the rotary kiln for feeding heat to the rotary kiln, wherein the heating unit is designed with a burner which has:
        a burner housing having a longitudinal axis;
        an air duct arranged at the burner housing for supplying air,
        a swirling element for swirling the air in the burner housing relative to the longitudinal axis;
        a hydrogen gas line connected to the burner for feeding hydrogen gas into the burner, wherein a hydrogen gas nozzle is connected to the hydrogen gas line for discharging the hydrogen gas;
        a burner head arranged at the burner housing for generating a burner flame;
    a secondary fuel line connected to the burner for supplying secondary fuel, wherein a secondary fuel nozzle for discharging the secondary fuel is connected to the secondary fuel line.

23. A method for drying material for an asphalt mixing facility, comprising the method steps of:
    feeding the material into a rotary kiln that is rotatably drivable about an axis of rotation;
    generating heat with a burner of a heating unit by combusting hydrogen gas, wherein the burner is operable with hydrogen gas alone;
    feeding the heat to the rotary kiln, and drying the material;
    feeding exhaust gases to at least one of the group comprising the heating unit and the rotary kiln by means of an exhaust gas line.

24. A method for drying material for an asphalt mixing facility, comprising the method steps of:
    feeding the material into a rotary kiln that is rotatably drivable about an axis of rotation;
    generating heat with a burner of a heating unit by combusting hydrogen gas, wherein the burner is operable with hydrogen gas alone;
    feeding the heat to the rotary kiln, and drying the material, wherein the heat is supplied by a burner flame inside the rotary kiln, so that the burner flame is arranged in a dust-loaded environment, wherein the burner flame in the rotary kiln has a length oriented along the axis of rotation which is smaller than or equal to a length of a burnout zone of the rotary kiln oriented along the axis of rotation.

25. A method for drying material for an asphalt mixing facility, comprising the method steps of:
feeding the material into a rotary kiln that is rotatably drivable about an axis of rotation;
generating heat with a burner of a heating unit by combusting hydrogen gas, wherein the burner is operable with hydrogen gas alone;
feeding the heat to the rotary kiln, and drying the material, wherein the heat is supplied by a burner flame inside the rotary kiln, so that the burner flame is arranged in a dust-loaded environment, wherein the burner flame has a diameter oriented perpendicular to the axis of rotation which is smaller than an inside diameter of a burnout zone of the rotary kiln reduced by fire protection internals.

* * * * *